United States Patent
Gammill et al.

[15] 3,667,423
[45] June 6, 1972

[54] METAL VAPOR COATING APPARATUS

[72] Inventors: Adrian Monroe Gammill, Ashton, Md.; Franklin Keith Guinn, Johnson City, Tenn.; Urban S. Bird, Unicoi, Tenn.; William R. Housholder, Erwin, Tenn.

[73] Assignee: Nuclear Fuel Services, Inc., Wheaton, Md.

[22] Filed: Dec. 6, 1968

[21] Appl. No.: 781,928

[52] U.S. Cl. .................................................118/48, 118/303
[51] Int. Cl. ............................................................C23c 11/00
[58] Field of Search ....................118/48–49.5, 603, 118/610; 117/100 I, 100 M; 75/84.5; 176/76

[56] References Cited
UNITED STATES PATENTS

| | | |
|---|---|---|
| 3,112,220 | 11/1963 | Heiser, Jr. et al. ...................117/100 A |
| 3,121,047 | 2/1964 | Stoughton.............................176/69 |
| 3,165,422 | 1/1965 | Stoughton et al. ...................117/100 B |
| 3,252,823 | 5/1966 | Jacobsen et al. ....................117/100 M |
| 3,390,980 | 7/1968 | Orbach et al. ..........................75/84.5 |
| 3,447,950 | 6/1969 | Evans et al. .........................117/100 M |

*Primary Examiner*—Morris Kaplan
*Attorney*—Joseph P. Nigon and Kenneth E. Prince

[57] ABSTRACT

An apparatus for coating nuclear fuel particles with a metal by the decomposition of the metal salts and the deposition of the free metal on the fuel particles.

3 Claims, 1 Drawing Figure

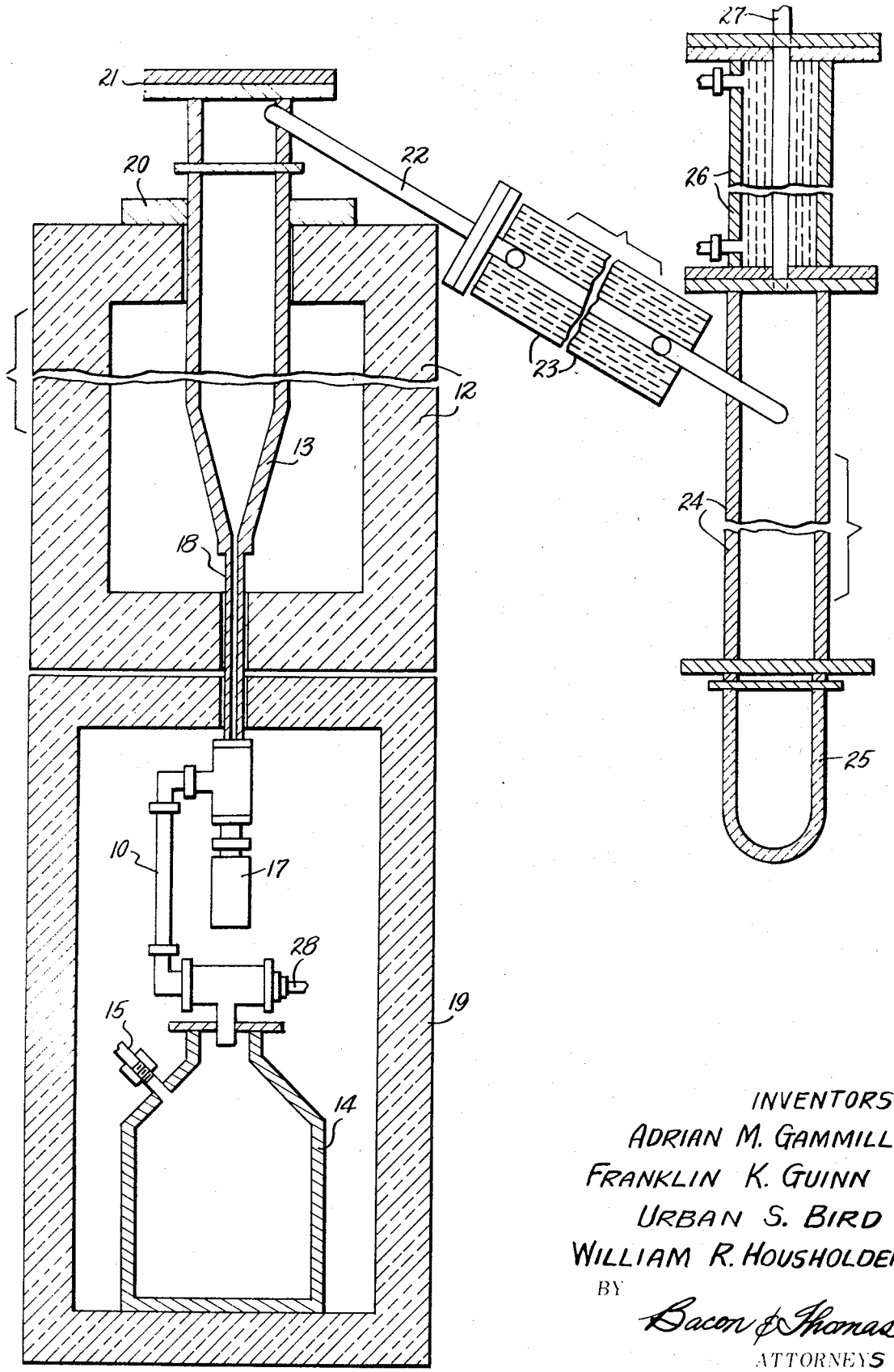

METAL VAPOR COATING APPARATUS

This invention relates to a new and improved apparatus for coating particles to be used in the preparation of nuclear fuels. In one particular embodiment, it relates to an apparatus for coating nuclear fuel particles with niobium by the decomposition of the pentachloride and deposition of the niobium metal on the fuel particles.

Although the coating of nuclear fuel materials with metals has been disclosed previously, there is a dearth of information on the coating of micron size particles of these materials. The particles coated by the prior art method were generally massive pieces of the nuclear fuels or particles of the fuels substantially above the micron size range.

U.S. Pat. No. 2,894,320, for example, describes a process for coating uranium metal by decomposition of the carbonyls of nickel, molybdenum, chromium, columbium, tungsten, and copper. This coating is effected by heating the metal to be coated to a temperature high enough to decompose the carbonyl and to diffuse at least part of the metal coating within the uranium body. The coated body is then heated to a temperature higher than the coating temperature to thermally diffuse the coating metal within the uranium body.

Although this process works satisfactorily for massive pieces of uranium metal (1 inch to 3 inches in length), it would have no applicability for coating micron size particles.

Although our novel apparatus can be used for coating any fuel particles in the micron size, particularly good results have been achieved in coating the spheriodal particles conveniently termed microspheres.

The introduction of microspheres such as described in U.S. Pat. No. 3,331,785 has been a major improvement in fuel technology. The principle advantage of the microspheres is that they can be prepared in uniform sizes. Spheres in the 40 to 500 micron size range have achieved wide acceptance as nuclear fuel particles. Our novel apparatus is particularly advantageous for coating these microspheres.

It is a general object of this invention to provide a new and improved means for coating fuel particles with a protective metal coating.

Another object of this invention is the provision of a new and better coating apparatus capable of coating a substantial number of fuel particles simultaneously. A further object of this invention is the provision of a new and better coating apparatus for coating spherical fuel particles with a coating about 10 microns in thickness.

For the purposes of illustrating the invention, there is shown in the drawings a form which is presently preferred. It being understood, however, that the invention is not limited to the precise arrangement and instrumentality shown.

In the drawing, there is shown a cross-sectional view of the coating apparatus of the present invention. The apparatus comprises a main coating housing in which is positioned a reactor furnace 12 that heats the reactor tube 13 in which the microspheres or other particles can be coated or loaded. The reactor tube is of Inconel construction and is a solid machined cone. It has a special welded joint above the cone which can be honed to give a very smooth interior surface. The reactor tube 13 is heated over its entire length by the furnace 12. Positioned below the furnace and reactor tube, and operably connected to the tube is a vaporizer. This vaporizer consists of a container 14 having a gas inlet tube 15. A flexible tube 10 is connected through a T positioned in the top of the vaporizer, and extends around trap 17 and connects to a tube 18 which leads to the cone of the reaction tube. A tube 28 is also a part of the gas sweep system. The vaporizer 14 is heated by a furnace 19 that preheats the gases before they are fed to the reactor tube 13. The reactor tube 13 is supported by a support member 20 and is covered by a flange 21. The gases leaving the reactor tube are removed through the tube 22 to a cyclone system 24. The tube 22 is cooled for a substantial portion of its length by the condensor 23. The cyclone system 24 is equipped with a trap 25 for removal of any particles that may be carried over by entrainment. The upper part of the cyclone is equipped with another gas cooler 26 that further cools the gases prior to passing through tube 27 to a filter and caustic scrubber system (not shown).

In a representative embodiment, the reactor tube is from 1 to 5 inches in diameter with a conical bottom portion having a cone angle of about 30° terminating in a constricted entrance orifice of 0.050 to 0.150 inches.

The operation of the apparatus will be described for a process in which microspheres are coated with niobium pentachloride. This example is purely illustrative and in no way limits the invention.

The vaporizer 14 is filled with solid niobium pentachloride and heated to the melting point by the furnace 19. Hydrogen sweep gas, that has been previously heated by passing through coils in the vaporizer oven, enters the vaporizer at 15 and 28 and continuously sweeps gaseous niobium pentachloride through the flexible tube 10 past the trap 17 to the tube 18. The gas added at 28 also contains argon. The reactor tube 13 is charged with up to 4 kg. of microspheres which are to be coated by removing flange 21, pouring microspheres into the tube and closing the flange. The reactor can be equipped with vibrators and other devices to prevent sticking of the particles being coated. The reactor 13 is heated over its entire length to a temperature high enough to decompose the gas being fed either thermally or by reduction with hydrogen. In the case of niobium pentachloride, the tube 13 is heated to about 600°–800° C., preferably 750° to 800° C. The gases leaving the reactor tube are cooled in the water condensers 23 and 26 and passed into the cyclone 24. Any particles that are carried over by the gas stream are collected in the trap 25 and periodically removed. The gases are further cooled in the area 26 prior to passing through the tube 27 to a filter and caustic scrubber system (not shown) where the noxious components are removed from the gases and the gases are vented to the atmosphere.

A said particle trap 17 is used to collect the particles in the case of loss of gas pressure.

The reactor is cooled under argon at the end of each run and the spheres are removed from the reactor 13 into an unloading vessel.

The present invention may be embodied in other specific forms without departing from the essence and scope thereof. Accordingly, references should be made to the appended claims rather than the foregoing specifications as indicated in the scope of the invention.

What is claimed is:

1. Coating apparatus, comprising: a reactor tube closed at its upper extremity, said reactor tube including a conical bottom portion having a constricted orifice at the lower extremity thereof, heating means for heating substantially the full length of said reactor tube; a heating furnace positioned below said reactor tube and containing a vaporizing vessel for vaporizing a metal salt to be used to furnish the coating metal, tube means connecting said vaporizing vessel with the constricted orifice of said reactor tube, a sweep gas tube communicating with said vaporizing vessel for moving said metal salt vapors from said vessel through said connecting tube into said reactor tube, and trap means positioned directly below said constricted inlet orifice, said connecting tube having a vertical section providing communication between said inlet orifice and said trap whereby any produce particles which may fall from said reactor tube through said constricted orifice are caught in said trap and a branch section establishing communication from said vaporizing vessel to said vertical section of the connecting tube above said trap; gas outlet means positioned in the upper portion of said reactor tube for removing decomposition products of said metal compounds from said reactor tube and connected with an outlet tube, condenser means positioned on said gas outlet tube to cool gases removed from said reactor tube, and recovery means connected to said gas outlet tube for removal of decomposition products of said metal salt from the exiting gas stream, said recovery means being equipped with trap means for separation from said cooled exiting gas stream of fine particles swept from said reaction tube.

2. Coating apparatus in accordance with claim 1, wherein said reactor tube comprises an elongated tube 1 to 5 inches in diameter having a conical bottom portion with a cone angle of about 30°, and a constricted entrance orifice of 0.050 to 0.150 inches, and wherein said gas outlet means includes an exit tube obtusely intersecting said reactor closer to said closed end than to said constricted gas entrance orifice, whereby the decomposition products of metal compound are rapidly removed from said reactor.

3. Coating apparatus according to claim 1, wherein said gas outlet means includes an exit tube obtusely intersecting said reactor closer to said reactor closing means than to said reactor constricted entrance orifice to prevent return of decomposition products of said metal salt to said reactor, and wherein said recovery means includes a filter and caustic scrubber system, whereby noxious components are removed from said exiting gases prior to venting to the atmosphere.

* * * * *